United States Patent [19]

Watkins et al.

[11] Patent Number: 5,220,512
[45] Date of Patent: Jun. 15, 1993

[54] SYSTEM FOR SIMULTANEOUS, INTERACTIVE PRESENTATION OF ELECTRONIC CIRCUIT DIAGRAMS AND SIMULATION DATA

[75] Inventors: Daniel Watkins, Los Altos; Jeffrey A. Werner, Santa Clara; H. I. Hweizen, San Jose, all of Calif.

[73] Assignee: LSI Logic Corporation, Milpitas, Calif.

[21] Appl. No.: 917,801

[22] Filed: Jul. 20, 1992

Related U.S. Application Data

[63] Continuation of Ser. No. 512,129, Apr. 19, 1990, abandoned.

[51] Int. Cl.$^5$ ............................................. G06F 15/60
[52] U.S. Cl. ..................................... 364/489; 364/578
[58] Field of Search ........................... 364/488–491, 364/578, 480

[56] References Cited

U.S. PATENT DOCUMENTS

| | | | |
|---|---|---|---|
| 4,353,117 | 10/1982 | Spellmann | 364/488 |
| 4,527,249 | 7/1985 | Van Brunt | 364/578 |
| 4,587,625 | 5/1986 | Marino, Jr. et al. | 364/578 |
| 4,653,090 | 3/1987 | Hayden | 379/204 |
| 4,675,832 | 6/1987 | Robinson et al. | 364/488 |
| 4,694,411 | 9/1987 | Burrows | 364/578 |
| 4,775,950 | 10/1988 | Terada et al. | 364/578 |
| 4,789,944 | 12/1988 | Wada et al. | 364/488 |
| 4,791,593 | 12/1988 | Hennion | 364/578 |
| 4,813,013 | 3/1989 | Dunn | 364/900 |
| 4,815,016 | 3/1989 | Young | 364/578 |
| 4,831,543 | 5/1989 | Mastellone | 364/489 |
| 4,839,821 | 6/1989 | Murakata | 364/491 |
| 4,852,015 | 7/1989 | Doyle, Jr. | 364/491 |
| 4,855,726 | 8/1989 | Nishio | 340/747 |
| 4,855,929 | 8/1989 | Nakajima | 364/490 |
| 4,858,143 | 8/1989 | Fournier | 364/491 |
| 4,868,770 | 9/1989 | Smith et al. | 364/578 |
| 4,873,647 | 10/1989 | Banki et al. | 364/488 |
| 4,918,614 | 4/1990 | Modarres et al. | 364/489 |
| 4,965,741 | 10/1990 | Winchell et al. | 364/488 |
| 4,970,664 | 11/1990 | Kaiser et al. | 364/488 |

OTHER PUBLICATIONS

"Here's An Easy Way To Test ASICs" *Electronics* May 1989 pp. 116–117.
"Chip Simulation is all a Matter of Image" *ESD*, Nov. 1988 pp. 65–70.
"Here's Software to Speed Vector Creation" *Electronics*, May 1989 pp. 48, 52.
"Linda: a Local Interactive Design Aid"; M. J. Biggs; GEC Jour. Science & Tech (V43,N2) 1976; pp. 77–84.
"Computer Aided Design for LSI circuits"; D. K. Lynn; Computer (May/Jun. 1972); pp. 36–45.
"Computer Graphics in Power Plant Design"; W. L. Strong et al.; IEEE Conf Power Engineering 1978; pp. 1–7.
"Tango-Schematic Capture Software"; Perx Catalog; pp. 18 & 19.
"Design Automation"; Computer (May/Jun. 1972); pp. 19–35.
Tek Products 1988: Design Automation Products; Tektronix; 1987; pp. 83–90.
"An Engineering System for Designer, Manager & Manufacturer"; Telesis 1976; pp. 268–273.
"DAS, An Automated System to Support Design Analysis"; IEEE Conf. Circuits, Systems & Computers; 1978; pp. 646–650.

*Primary Examiner*—Kevin J. Teska
*Attorney, Agent, or Firm*—Gerald E. Linden; Michael D. Rostosker

[57] ABSTRACT

A system for interactive, design and stimulation of an electronic circuit allowing a user to design a circuit by graphical entry and to view full or partial simulation and design results, simultaneously, on a single display window. The user is able to define the form of a display of speed, delay, loading, symbols, simulation input and/or output values on each node and any path of the design. Simulation may be user-defined or other process time.

17 Claims, 4 Drawing Sheets

SYSTEM FOR SIMULTANEOUS, INTERACTIVE PRESENTATION OF ELECTRONIC CIRCUIT DIAGRAMS AND SIMULATION DATA

This is a continuation of copending, commonly-owned U.S. patent application Ser. No. 512,129, filed Apr. 19, 1990 now abandoned.

TECHNICAL FIELD OF THE INVENTION

The present invention relates to computer-aided design tools, particularly where the design process is effected by interactive, graphical entry of a schematic diagram on a graphical computer display.

BACKGROUND OF THE INVENTION

Present computer aided design (CAD) systems for the design of electronic circuits, hereinafter referred to as ECAD or Electronic CAD systems, assist in the design of electronic circuits by providing a user with a set of software tools running on a digital computer with a graphical display device. These software tools generally include a schematic editor, a schematic compiler, and a simulator.

The schematic editor of the ECAD system is usually an interactive software tool which enables the user to select from a number of circuit elements which will be graphically displayed upon a graphical/text display device, hereinafter referred to as the display screen, connected to the computer. These displayed elements may then be interconnected by lines representing wires drawn on the display screen by the user through interaction with the computer via a position input device, which may be a pointing device such as a mouse, trackball, joystick, graphic tablet, or keyboard used to enter coordinates on the display screen and commands to the software tool. The circuit elements and their interconnecting wires form a schematic diagram which is viewed either in whole or in part on the display screen. As the schematic diagram is constructed on the display screen, the computer represents these elements in a storage medium, which may be a memory or a mass storage device such a magnetic disk drive. These representations, taken as a group, form a numerical representation of the schematic which has been entered by the user in a standardized form which is understood by the schematic editor. Typically, this form has been optimized for the entry and modification of schematic information.

Often, schematic editors allow for heirarchical design whereby a previously created and stored circuit may be recalled and viewed and used as a macro-level component in other circuits. Multiple instances of such macro-level components may be included in a higher-level schematic diagram. The schematic editor creates data structures effectively replicating the macro-level component. The higher-level schematic may further be incorporated as a macro-level component into yet higher-level schematic diagrams, and so on.

Typically, the form of user interaction with the schematic editor is an object-oriented screen display whereby the user thereof may manipulate objects on the screen through the use of a pointing device. A pointing device is any device through the use of which a user may "point" to and identify objects on a display screen. Such object-oriented interfaces are well known to those skilled in the art. One example of such and interface is the Macintosh Finder for the Apple Macintosh computer, both produced by Apple Computer, Inc. Another example of such an interface is that of Microsoft Windows, produced by Microsoft Corp. of Redmond, Wash.

In order to simulate the performance of the circuit, it is necessary to run a simulator. A simulator is a software tool which operates on: a digital representation, or simulation model of a circuit, a list of input stimuli representing real inputs, and data about the performance characteristics of the represented circuit elements; and generates a numerical representation of the response of the circuit which may then either be viewed on the display screen as a list of values or further interpreted, often by a separate software program, and presented on the display screen in graphical form. Typically, the graphical presentation is designed to produce an image similar to what one would see on an oscilloscope or logic analyzer screen monitoring a real circuit connected as described in the schematic diagram if the real inputs represented by the list of input stimuli were applied. The simulator may be run either on the same computer which is used for schematic entry, or on another piece of electronic apparatus specially designed for simulation. Simulators which run entirely in software on a general purpose computer, whether the same as or different from the one used for schematic entry, will hereinafter be referred to as software simulators. Simulations which are run with the assistance of specially designed electronic apparatus will hereinafter be referred to as hardware simulators. An example of a such a hardware simulator is described in U.S. Pat. No. 4,587,625, entitled PROCESS FOR SIMULATING DIGITAL STRUCTURES. Usually, software simulators perform a very large number of calculations compared to the number required for schematic entry and operate slowly from the user's point of view. In order to optimize performance, the format of the simulation model is designed for very efficient use by the simulator. Hardware simulators, by nature, require that the simulation model comprising the circuit description and its performance parameters be communicated in a specially designed format. In either case, a translation process is required.

Simulation is often provided by utilizing simulation models at one or more of several different levels. Component-level models attempt to describe the exact behavior of a specific component, such as a gate or transistor, when it is acted upon by a stimulus or stimuli. Behavioral-level models provide a simplified model of extremely complicated devices, such as a microprocessor, or an operational amplifier. Such models, if simulated exactly on a transistor by transistor basis, would become prohibitive in terms of the size of their descriptions and the number of calculations and amount of computing time required to completely simulate their function. In response to this, the behavioral-level model provides a logical or mathematical equation or set of equations describing the behavior of the component, viewed as a "black box". Such models may either provide a very complete and accurate description of the performance of the modeled device, or a simple description of the types of signals one might expect the modeled device to produce. For example, a behavioral model of a microprocessor might provide the user with the capability of issuing various types of bus cycles, but not the capacity to actually simulate the execution of a program. Circuit-level models typically comprise a plurality of component-level and/or behavioral-level models and the descriptions of their interconnections for the purpose of simulating the performance of a complete circuit comprising a number of interconnected components. Simulations of heirarchical designs require that the included macro-level components also be simulated. Circuit-level or behavioral-level models of the macro-level components may be used to simplify this task.

The simulation model used by the simulator is usually derived from the output of the schematic editor by a schematic compiler, also making use of information about performance characteristics of the circuits, often stored in simulation libraries. Simulation libraries contain simulation characteristics of numerous circuit components and are typically maintained in files on the computer's on-line storage devices. The schematic compiler is a software tool which interprets the circuit element and interconnection information generated by the schematic editor and the performance characteristics stored in the simulation libraries, and reorganizes and translates them into the simulation model for the circuit. Occasionally, either the simulator or the schematic editor includes the function of a schematic compiler, in which case, separate compilation is not required.

Simulators often allow several different types of simulation. One type is a complete simulation run, where an initial set of conditions is specified, a set of input stimuli is defined and the duration of the simulated run is specified. The simulator then operates on the data and produces a file of the results which may be displayed. Another type of simulation, similar to the complete simulation run is an event-terminated run, whereby the simulation is run until a certain pre-specified event occurs in the simulation results. The simulation may be terminated immediately at that point, or run for some simulated duration afterwards. One final type of simulation run is a stepped simulation run, whereby the current simulation may be "stepped" by one unit of time, or one clock cycle, or some other similar criterion.

The process of designing an electronic circuit on a typical ECAD system is done in several discrete steps. A schematic diagram of the circuit is entered interactively through the use of a schematic editor which produces a digital representation of the circuit elements and their interconnections. The user of the ECAD system then prepares a list of input stimuli representing real input values to be applied to the simulation model of the circuit. This representation is then compiled by a schematic compiler and translated into a form which is best suited to simulation. This new, translated representation of the circuit is then operated upon by a simulator, which produces numerical output analogous to the response of a real circuit with the same inputs applied. This output is then usually presented to the user in a graphical fashion. By viewing the simulation results, the user may then determine if the represented circuit will perform correctly when it is constructed. If not, he may then re-edit the schematic of the circuit using the schematic editor, re-compile and re-simulate. This process is performed iteratively until the user is satisfied that the design of the circuit is correct.

The Modular Design Environment (MDE) produced by LSI Logic Corporation of Milpitas, Calif., is a suite of software tools for computers running the UNIX operating system produced by AT&T Corporation. MDE comprises a schematic editor (LSED) and a simulator (LDS), among other software programs, and provides an example of commercially available tools of the aforementioned type. Another example of a schematic editor, schematic compiler, and schematic simulator may be found in the SCALDstation produced by Valid Logic Systems, Inc. of Mountain View, Calif.

While the design process outlined herein is significantly faster and less error prone than manual design, the user must still go through the design process in a number of discrete, disjointed steps. The design process is broken into two or three separate thought processes. First, the user must enter the schematic into the computer using a schematic editor. Second, the user completes the schematic entry process and instructs the appropriate software tool (schematic editor, schematic compiler, or simulator) to prepare the design for simulation. Third, the user must create simulation stimuli, usually with the assistance of yet another software tool, and instruct the simulator to apply these stimuli to the simulation model of the circuit being designed. The results are viewed by the user, who then makes a judgement about whether the design is performing correctly.

In modern digital systems, designs incorporating 20,000 logic gates or more are not uncommon. Also, in modern analog electronic systems, especially where the function being designed is intended to be incorporated into an integrated circuit, it is not uncommon to encounter designs comprising many hundreds of transistors and other electronic devices. These designs, due to their complexity, present a need for frequent simulation of the circuit being designed in small parts before it is simulated as a whole. This is necessary because errors in a small portion of the circuit are easy to detect when that small portion is simulated in isolation. On the other hand, when the entire circuit is simulated, compound errors may occur which mask other errors. Further the enormity of modern circuit complexity makes the errors in the small portion of the circuit difficult to recognize.

This need for frequent, partial simulation is somewhat frustrated by current ECAD systems which require the user to break his train of thought in the design process and to move from one tool to the next. Some ECAD systems have begun to attack this problem by providing "windowed" displays, whereby the user may display the output of several software programs at once on different portions of the display screen. This design environment, however is still not fully interactive. In order to simulate small portions of a circuit, the user may need to design special test circuits incorporating those small portions of the circuit and simulate them in isolation.

DISCLOSURE OF THE INVENTION

It is therefore an object of the present invention to provide an improved ECAD system whereby the characteristics of schematic editor, schematic compiler, and simulator are all presented to the user in a fashion such that they appear as a single, integrated function.

It is a further object of the present invention to allow portions of a circuit which is being designed on such an improved ECAD system to be simulated in isolation without requiring that those circuit portions be copied to another schematic, regardless of whether or not the overall schematic diagram has been completed, and regardless of whether or not the circuit portion has other connections.

It is a further object of the present invention to allow the user to view full or partial simulation results on the display screen representation of the schematic as it is being edited on the improved ECAD system.

It is a further object of the invention to enable the user to view state, performance, loading, drive strength or other relevant data (hereinafter, "state" data) in display areas immediately adjacent to the schematic object to which it pertains.

It is a further object of the invention to enable the user to perform simulator setup on the schematic diagram by using point and select techniques to identify items to be simulated, input values, override values, and points to be monitored.

It is a further object of the invention to enable the user to create state tables for circuits, portions of circuits, or components.

It is a further object of the invention to enable the user to store the interactive state data for viewing at another time.

It is a further object of the invention to enable the user to create macros to move through the simulation in defined steps (of "n" time units of the lowest system granularity), or to cycle a clock.

It is a further object of the invention to enable the user to pop up data sheets or any library element being used, and further to allow the user to define his/her own data sheets and to allow these to be popped up in the schematic editor environment.

According to the invention, there is provided an electronic CAD system comprising a computer processor, mass storage, a display screen, means for user input, and means for circuit simulation. The electronic hardware of the means for simulation may comprise the ECAD system's computer, one or more general purpose computers interfaced to the ECAD system's computer, one or more hardware simulators interfaced to the ECAD system's computer, or any combination of these. The user interacts with the ECAD system through the use of an object-oriented user interface, whereby the user may create, select, move, modify and delete objects on the display screen, where objects may represent circuit components, wires, commands, text values, or any other visual representation of data. The graphical and software techniques of interacting with a user on such an object-oriented user interface are well known to those skilled in the art and need not be elaborated upon in this discussion.

A component database resides on the ECAD system's mass storage. This database comprises a number of data objects: graphical symbols, connection information, timing parameters, and simulation models corresponding to various electronic components. These data objects contain all of the information necessary to display, interconnect, and edit schematic symbols on a graphical display screen. The simulation model data objects contain the behavioral data corresponding to the components represented by the graphical objects such that the simulator may produce results closely approximating those that would be observed if real components were used and measured on standard laboratory instrumentation.

Five major software program functions run on the ECAD system: a schematic editor, a logic compiler, a logic simulator, a logic verifier, and a layout program. The schematic editor program allows the user of the system to enter and/or modify a schematic diagram using the display screen, generating a net-list (summary of connections between components) in the process. The logic compiler takes the net list as an input, and using the component database puts all of the information necessary for layout, verification and simulation into a schematic object file or files whose format(s) is(are) optimized specifically for those functions. The logic verifier checks the schematic for design errors, such as multiple outputs connected together, overloaded signal paths, etc., and generates error indications if any such design problems exist. The logic simulator takes the schematic object file(s) and simulation models, and generates a set of simulation results, acting on instructions initial conditions and input signal values provided to it either in the form of a file or user input. The layout program generates data from which a semiconductor chip (or a circuit board) may be laid out and produced.

These programs are typical of similar, discrete programs existing in the current art, but are slightly modified (improved in their functionality) in the source of their control information. The editor's user interface is extended such that the simulator functions may be requested by the user. It is further modified such that whenever a change is made to the schematic, the editor updates its output files (net list, etc.) and signals the logic compiler to re-compile the schematic using the new data. The logic compiler is modified to accept such commands directly from the editor, rather than from user input. The simulator is modified such that it can accept directly from the editor: requests for simulation runs, initial data, signal data, and other information usually entered by the user via the keyboard and/or pointing device. It is further modified to signal the editor that it has completed a simulation operation, and to provide its results in the form of a data structure, either in memory or in a disk file, rather than to the display screen. The logic verifier is also modified such that it interacts with the editor directly, rather than with the display screen and keyboard/pointing device.

Further according to the invention, the editor causes the logic compiler to re-compile the schematic each time a graphical object (schematic symbol) is added, modified, or deleted, and each time a connection is made, changed or removed. In this way, the editor ensures that the net-list and simulation structures are always current and representative of the schematic diagram as displayed on the ECAD system's graphical display screen.

At any time, the user may instruct the editor to create areas on the display screen adjacent to selected schematic symbol connection points (pins) or on connection nets (wires). By conventions already in place in all editors, compilers, and simulators, these connection points and/or connection nets are uniquely identifiable. The user may specify that these data areas are to contain textual state data, or graphical state data. Next the user may identify certain signal values to be injected into the circuit representation. Ordinarily these would be input signals, but for simulation of part of the schematic, it is possible to override the outputs of selected schematic object to force special conditions to exist on a net, or to force signals into a particular input connection point on a schematic object, effectively overriding its connection. It is also possible for the user to indicate that only certain components are to be compiled and simulated, thus improving the compile and simulation times. This is accomplished by one of two means: either subset net-list and object files are created, reducing the amount of data to be handled by the logic compiler and logic simulator, or software flags are provided in the data structures indicating which data objects are to be considered active, allowing the logic compiler to selectively compile the schematic and allowing the logic simulator to selectively simulate the schematic.

All of the user input occurs by pointing with the pointing device and selecting connection nodes, nets or devices and issuing commands which affect the selected object's numerical parameters. Each data object (schematic symbol, connection net (wire), and connection point (pin)) has special parameters which allow it to be made eligible or ineligible for compile and/or simulation, and to have some or all of its other parameters overridden for the purposes of simulation.

When the user wishes to perform a simulation he issues a command which is relayed by the editor to the simulator. The simulator performs a simulation run according to the user's specification and places the simulation results into a data structure. It signals the editor that the simulation is complete and then fills in the results on the screen, according to the user's display specification. The user may specify a complete simulation run from a set of initial conditions or a simulation stepped run which continues from the last simulation's ending point. In the event of a complete simulation run, a new simulation results data structure is created and filled in. In the event of a stepped run, the simulator appends new simulation data to the end of the previously created simulation results data structure.

Simulators, by their nature, must maintain the last state (history) of every node for every enabled component in the schematic. However, this history is kept only for those signals requested. This is done to minimize the amount of data storage required. It is possible to request that the history be maintained for all nodes at the expense of some amount of additional memory (or disk space) required.

When the editor receives notification from the simulator that the simulation run is finished, it displays the simulation data on the screen according the specifications for the display areas that the user has requested. If it is a textual display area, then the last state of the node is written into the allocated display area. If it is a graphical (timing diagram) display area, then the history data is presented in the allocated display area in the form of a timing diagram. In either case, the user can step through the state data back from the end point to any previous point in the simulation from the beginning of the session.

The editor may also create, at the user's request, an area on the screen for the presentation of a state table. The user identifies the signals to be monitored and identifies the simulation conditions. The editor then draws a table on the screen and headings corresponding to the monitored signals' names, and requests a series of stepped simulations. After each step, the editor records the last state data into columns under the signal name headings, thus creating a state table of the type seen in component specifications.

Other objects, features and advantages of the invention will become apparent in light of the following description thereof.

DETAILED DESCRIPTION OF THE INVENTION

Figure 1:
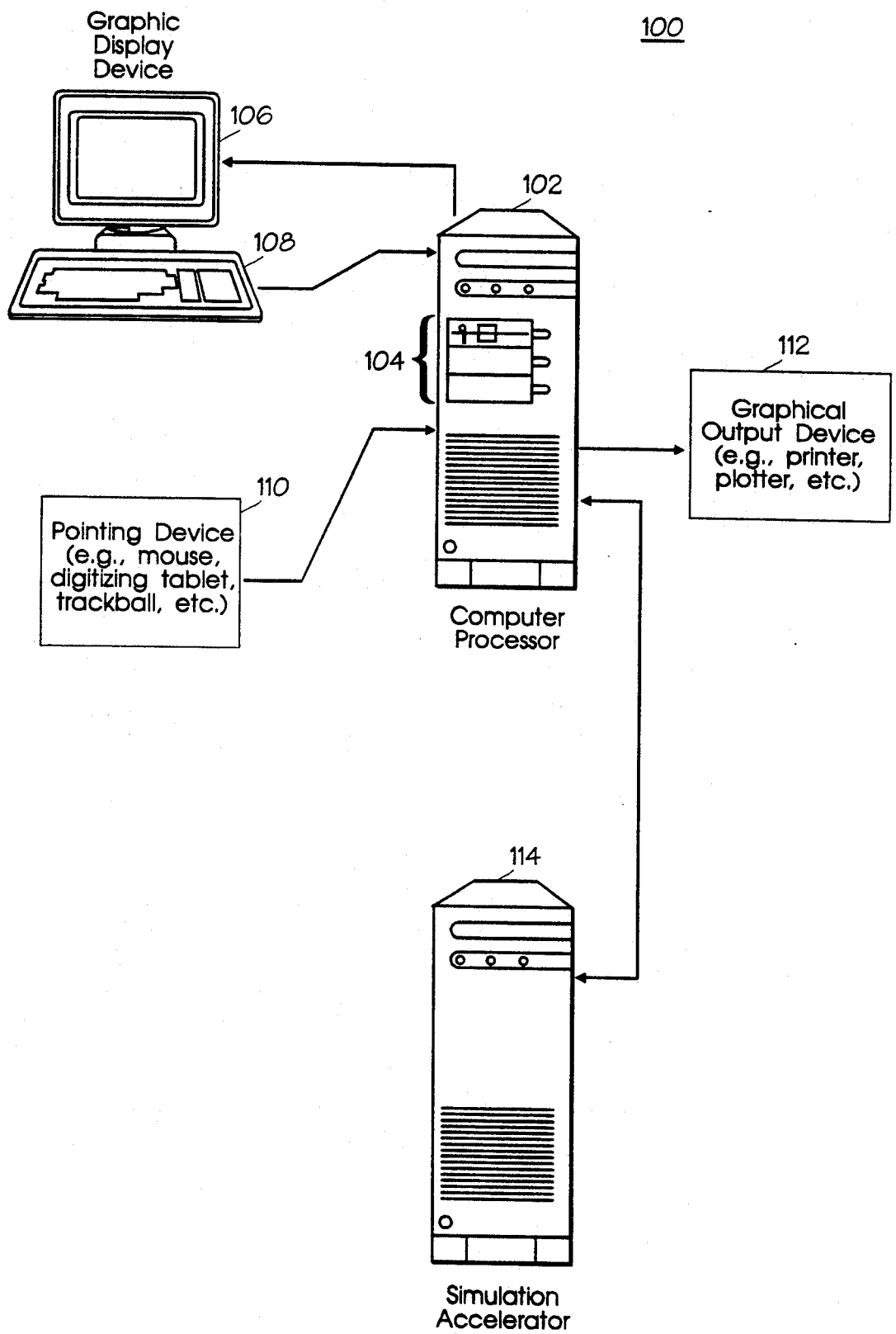
FIG. 1 is a block diagram of the ECAD system hardware of the present invention.

FIG. 1 shows an ECAD system 100 comprising: a computer processor 102 with mass storage devices 104, a graphical display device 106, a keyboard 108, a pointing device 110, a graphical output device 112, and a simulation accelerator, 114. The pointing device 110 may be a mouse, digitizing tablet, trackball, joystick, or any other similar cursor positioning device. The graphical output device 112 is intended for hard copy output of schematic diagrams and for the printing of layout artwork.

Figure 2:
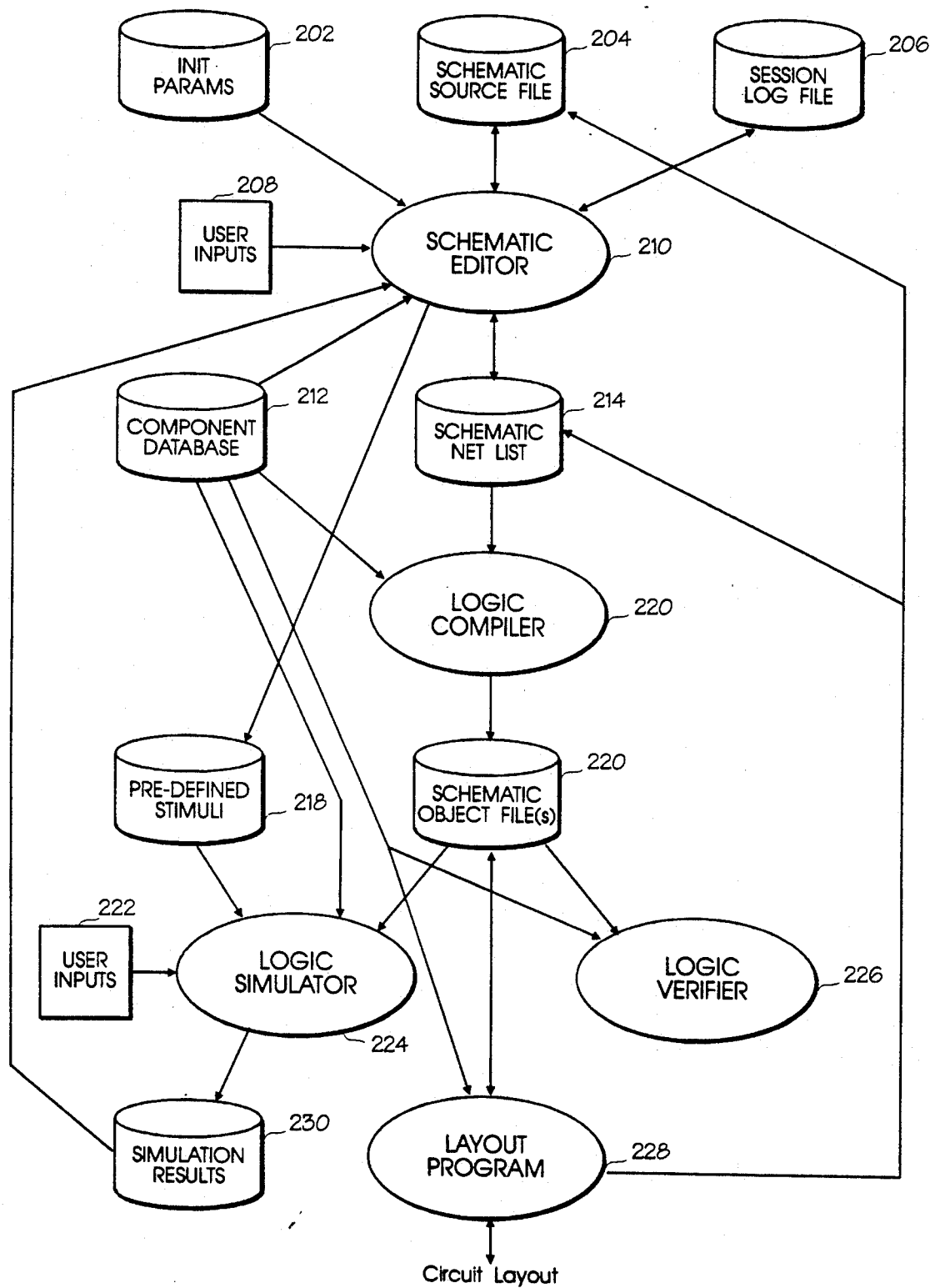
FIG. 2 is a software structure chart illustrating the major software components of the system of FIG. 1 and the data flow between them.

With respect to FIG. 2, there is resident within the ECAD system (100 of FIG. 1) a software system 200 comprising a number of data structures and programs. Upon initial startup, a schematic editor 210 reads in a series of initialization parameters 202 which set default mode selections and various configuration parameters. Said schematic editor may be the LSED editor by LSI Logic Corp., with modifications which will be described later. The schematic editor 210 accepts input from a schematic source file 204, and displays its graphical representation on the ECAD systems's graphical display screen (106 with respect to FIG. 1). If there is no schematic source file, it is assumed that a new schematic is being entered, and a blank entry sheet is presented on the display screen and a new, blank schematic source file 204 is created. The schematic editor operates according to commands coming from user inputs 208. Every command entered is recorded in a session log file 206 such that the editor may undo any number of commands entered by the user. Some commands from the user inputs 208 will be requests to place and interconnect schematic symbols on the display screen. To accomplish this, the schematic editor looks up the requested component(s) in a component database 212 and retrieves graphical symbol representations of the requested component(s) contained therein. As the user enters the schematic diagram on the screen, the schematic editor creates a net list and invokes the function of a logic compiler 216.

Modifications to the current LSED editor comprise:

1. Extensions to the net-list output structures to include status indicators on each component and net indicating "activated" or "deactivated" and "eligible for simulation" or "ineligible for simulation".

2. Extensions to the user command set to enable the user to simulation data values by pointing to nodes or nets and specifying data values and conditions. These data values and conditions will be stored in a data structure (218 with respect to FIG. 2) as pre-defined stimuli. Said data values and conditions may be the same data values and conditions already accepted by the LSIM simulator, produced by LSI Logic Corp.

3. Extensions to the user command set to enable the user to request simulator functions. The set of simulator functions will be those already accepted by LSI Logic Corporations LSIM simulator.

4. Extensions to the LSED editor function to permit it to signal (in software) the logic compiler and logic simulator to begin operation.

5. Extensions to the LSED editor function to permit it to detect when requested simulator and/or compiler operations have been completed and to detect status information returned by those programs (such as: specified simulation conditions met/not met, etc.).

6. Extensions to the user command set to enable the user to identify small display areas adjacent to schematic notes and/or nets for the display of simulation data relating to such nodes or nets. The internal representations of such display areas will contain indications of the type of display requested: textual state data or graphical timing data.

7. Extensions to the user command set such that a display area or display areas may be set aside for the display of state table information. Such commands will require that the user identify the signals to be included in the state table, provide stepping conditions for the simulator, optionally provide initial conditions for the first simulation run (through the mechanism of LSED editor modification number 2 above), and the number of steps to perform or some special ending conditions (through the mechanism of LSED editor modification number 3 above).

8. Extensions to the LSED editor function to permit iterative calls to the simulator according to user specifications (entered by the mechanism of LSED editor modification number 7 above), to wait each time the simulator is invoked until the requested operation is completed, and to read the simulator state information contained in the simulation results file (230 with respect to FIG. 2) and retrieve the state data corresponding to the user specified values to be entered into a state table or state tables and format it for display in columns under the corresponding signal name heading in the state table, each time advancing one line. After "n" iterations, there will be "n" lines of state information displayed in the state table.

9. Extensions to the LSED editor function to permit it to retrieve state information from the simulation results file (218 with respect to FIG. 2), to identify it by node or net name, and to format it for display as a textual logic state in its corresponding pre-allocated display area marked for textual state display (set up by the user through the mechanism of LSED editor modification number 6 above).

10. Extensions to the LSED editor function to permit it to retrieve state history information for the simulation results file (218 with respect to FIG. 2), to identify it by node or net name, and to format it for display as a graphical timing diagram in its corresponding pre-allocated display area marked for graphical timing display (set up by the user through the mechanism of LSED editor modification number 6 above).

11. Extensions to the LSED editor to permit it to store the interactive state data for viewing at another time, create macros to move through the interactive simulation in defined steps or to cycle a clock, pop up existing or user-defined data sheets on any library element being used.

Again with respect to FIG. 2, the logic compiler 216 may be the LCMP compiler produced by LSI Logic Corp., with modifications described below. Using the information in the schematic net-list 214 and the component data in the component database 212, the logic compiler creates a schematic object file or files, the structure(s) of which is(are) optimized for simulation, verification and layout (respectively). Said modifications to the LCMP compiler are made such that the compiler will accept its command stream from the schematic editor 210 rather than directly from user inputs. The LCMP compiler is also modified such that it will provide notification to the schematic editor that it has completed its operation. The LCMP compiler is further modified so that it will read parameters in the net-list identifying components and nets which have been deactivated. In response to a "deactivated" component or net, the compiler will simply skip over that component or net, effectively ignoring it and removing it (temporarily) from the design until it is again marked as "activated". Further modifications may be made to the compiler so that it will operate only on data in the schematic net list which has changed since the last compilation (incremental compilation), thus providing significantly reduced compile times, which, while desireable, is not strictly necessary for function.

Again with respect to FIG. 2, a logic simulator 224 operates on the schematic object file 220 and component simulation performance contained in the component database 212 according to a set of initial conditions and/or signal conditions specified as pre-defined stimuli 218. For standalone operations, simulator 224 may also operate off of user inputs 222. The logic simulator may be the LSIM logic simulator produced by LSI Logic Corp., with modifications as described below.

Modifications to the current LSIM logic simulator comprise:

1. Changes to the LSIM simulator's user interface such that it will accept its commands and parameters from the editor program (210 with respect to FIG. 2) rather than from direct user input.

2. Changes to the LSIM simulator's function such that it will return status about stopping conditions to the schematic editor upon completion of its simulation.

3. Changes to the simulation output such that results will be provided in a data structure (230 with respect to FIG. 2) rather than to a graphical device.

Again with respect to FIG. 2, a logic verifier, 226, performs design-rule checking of the schematic diagram captured by schematic editor 210 by checking the components and their interconnections contained in the schematic object file 220 against component interconnection and loading rules stored in component database 212.

Finally, a layout program, 228 with respect to FIG. 2, places components and routes their interconnections on a semiconductor chip. After completion of the layout, the schematic source file(s) 204, schematic net-list 214, and schematic object file(s) 220 are updated with information about placement location, placement orientation, and placement induced electrical characteristics.

Figure 3:
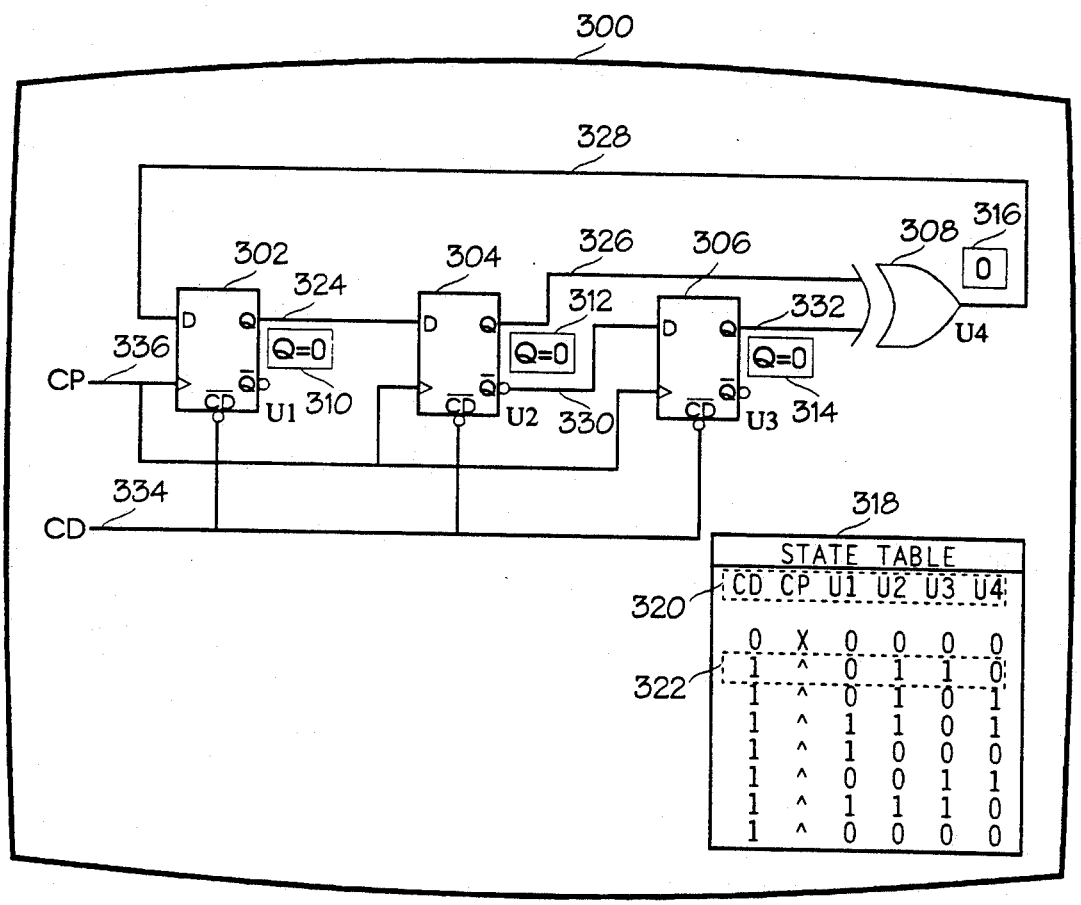
FIG. 3 shows a typical display screen image with text-based state data from simulation on the display device of FIG. 1.

FIG. 3 shows a representative editor display 300, namely a display of the screen of graphical display device 106 of FIG. 2, with graphical schematic components 302, 304, 306, and 308 and their interconnections 324, 326, 328, 330, 332, 334, and 336. In this particular display, the user has requested that textual state information be displayed. State display 310 corresponds to and is adjacent to net 324. State display 312 corresponds to and is adjacent to net 326. State display 314 corresponds to and is adjacent to net 332. State display 316 corresponds to and is adjacent to net 328.

FIG. 3 further shows the result of a state table having been built by simulation through the schematic editor. State table 318 contains monitored node/net names 320 and rows of simulation data (322 is a representative sample) arranged in columnar format under the corresponding node/net names. State table 318 is built by iterative invocations of the simulator by the schematic editor according to user specified monitoring and simulation conditions.

Figure 4:
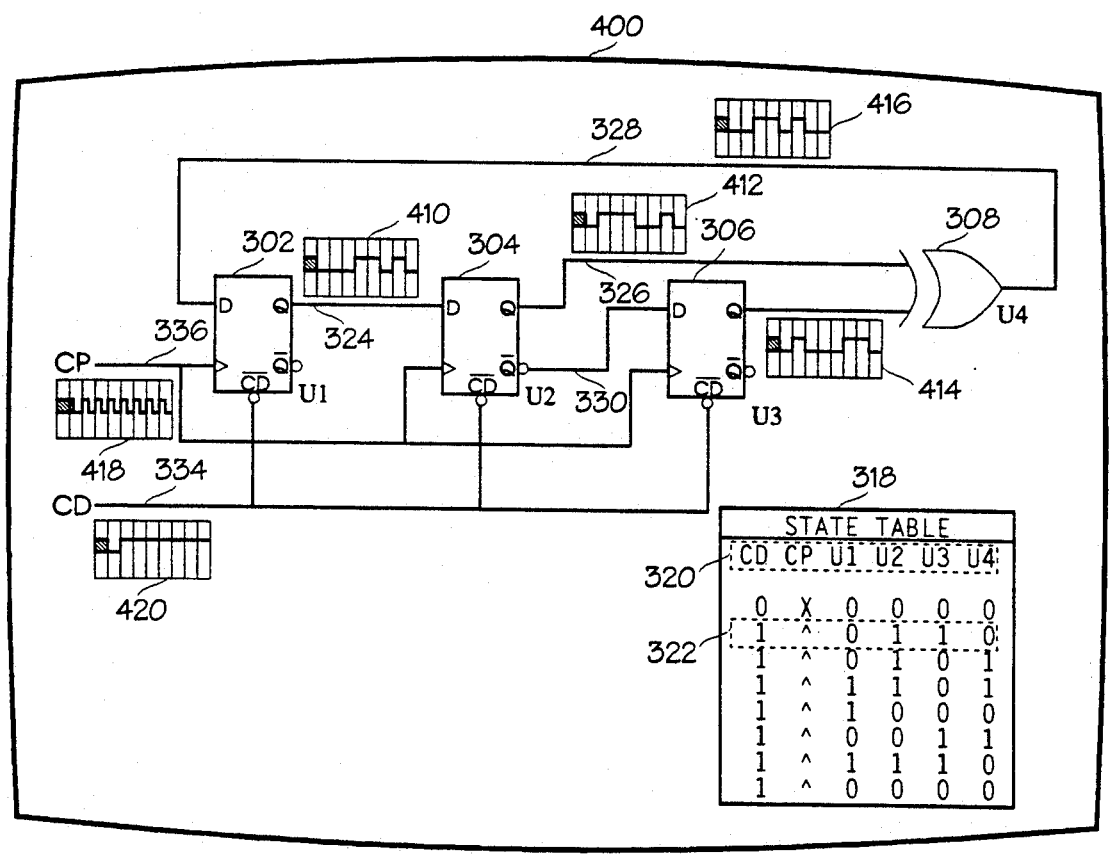
FIG. 4 shows a typical display screen image with graphic-based timing data from simulation on the display device of FIG. 1.

FIG. 4 shows a representative display screen image 400 namely a display of the screen of graphical display device 106 of FIG. 2, of the same circuit represented in FIG. 3 and under the same simulation conditions. Display screen image 400, however represents the visual results if graphical timing diagram displays are requested by the user rather than textual state display. Timing diagrams 410, 412, 414, 416, 418, and 420 correspond to and are adjacent to nets 324, 326, 332, 328, 336, and 334, respectively. Each horizontal division in each timing diagram contains a graphical depiction of the state events which occurred during one stepped simulation cycle. All other features of FIG. 4 are identical to the same features in FIG. 3.

The present invention is of benefit to any computer aided design system where the simultaneous display of a schematic diagram of a circuit, or any similar representation thereof, and its simulation data is desired.

What is claimed is:

1. An interactive schematic design and simulation system consisting essentially of:
   a computer processor, including means for storing graphical objects;
   graphical display means, connected to said computer processor, for displaying the graphical objects;
   a portion of the graphical objects are pre-defined graphical objects accessible to said computer processor, each representing a particular schematic symbol, and each having a plurality of input and/or output nodes to which input and/or output signals may be associated;
   means for graphically indicating interconnections between said input and output nodes of said graphical objects on said graphical display means;
   means for enabling a problem solving user to manipulate or arrange said pre-defined graphical objects on said graphical display means in the form of a schematic diagram, such that said schematic diagram may be viewed on said graphic display means either in whole or in part;
   means for enabling the problem solving user to create, delete or modify said graphical indications of interconnections between said graphical objects;
   wherein the computer processor includes a plurality of executable simulation models, the computer processor further including;
   means for representing the state of interconnections between said graphical objects in the form of a net-list;
   means for representing the state of interconnections between said graphical objects in the form of signal paths between simulation models;
   means for specifying a signal state on any input or output node of said graphical objects;
   means for specifying a signal state on any of said graphical interconnections (nets) between said input and output nodes of said graphical objects whereby said signal state is simultaneously applied to all input and output nodes connected thereto;
   means for specifying an identified portion of said schematic diagram to be simulated;
   means for specifying a simulation duration in the form a starting condition, or for specifying starting conditions and a stopping condition, or for specifying stopping conditions;
   means for executing a simulation of the identified portion of said schematic diagram according to said starting and stopping conditions; and
   means for displaying, on said schematic diagram on said graphical display means, the end states of said simulation such that the state data corresponding to the output noes of each of said graphical objects is displayed adjacent thereto and for displaying on said graphical display means real-time timing information and net values, and for displaying on said graphical display means the input, output and results of the simulation.

2. The system of claim 1, further comprising:
   means for enabling the problem solving user to specify a group of nodes or nets whose simulation results are to be collected in tabular form on said schematic diagram such that a state table is formed as the simulation(s) is(are) run.

3. The system of claim 1, further comprising:
   means for displaying, on said graphical display means, state performance loading drive strengths and other useful data on selected object nodes of each object.

4. The system of claim 1, further comprising:
   means for storing interactive state data.

5. The system of claim 1, further comprising:
   means for enabling the problem solving user to move through the interactive simulation in defined steps, or increments of the lowest system granularity.

6. The system of claim 1, further comprising:
   means for enabling the problem solving user to move through the interactive simulation in defined steps related to clock cycles.

7. The system of claim 1, further comprising:
   means for enabling the problem solving user to display, on said graphical display means, pre-defined or user-defined data sheets.

8. The system of claim 1, wherein:
   the executable simulation models are provided to the computer processor as user-prepared simulation stimuli in the form of a data file or data list.

9. The system of claim 8, further comprising:
   means for displaying, on said graphical display means, simulation results in the form of a waveform diagram (timing diagram) such that the waveform pertaining to each of the output nodes of each of said graphical objects is displayed adjacent thereto.

10. The system of claim 9, further comprising:
    means for grouping said waveform displays into a single composite timing diagram in a single area on said schematic diagram, and for displaying said composite timing diagram on said graphical display means.

11. An interactive schematic design and simulation system consisting essentially of:
    a computer processor, including means for storing graphical objects;
    graphical display means, connected to said computer processor, for displaying the graphical objects;
    a plurality of pre-defined graphical objects accessible to said computer processor, each representing a particular schematic symbol, and each having a plurality of input and/or output nodes to which input and/or output signals may be associated;

means for graphically indicating interconnections between said input and output nodes of said graphical objects on said graphical display;

means for representing the interconnections between said input and output nodes of said graphical objects as "nets";

means for enabling a problem solving user to manipulate or arrange said pre-defined graphical objects on said graphical display means in the form of a schematic diagram, such that said schematic diagram may be viewed on said graphic display either in whole or in part;

means for enabling the problem solving user to create "new nets" representing additional interconnections between said input and output noes of said graphical objects;

means for enabling the problem solving user to delete "nets" and "new nets";

means for enabling the problem solving user to modify "nets" and "new nets";

a plurality of executable simulation models accessible to said computer processor;

means for representing, and for displaying on said graphical display device, the current state of interconnections between said graphical objects in the form of a net-list;

means for representing the current state of interconnections between said graphical objects in the form of signal paths between simulation models;

means for specifying a signal state on any input or output node of said graphical objects;

means for specifying a signal state on any of said graphical interconnections (nets) between said input and output nodes of said graphical objects whereby said signal state is simultaneously applied to all input and output nodes connected thereto;

means for specifying a portion of said schematic diagram to be simulated;

means for supplying a test pattern for controlling a simulation;

means for executing a simulation of the identified portion of said schematic diagram according to said starting and stopping conditions; and means for displaying, on said schematic diagram, the end states of said simulation such that the state data corresponding to the output nodes of each of said graphical objects is displayed adjacent thereof;

further comprising:

means for displaying, on said graphical display device, simulation results in the form of a waveform diagram (timing diagram) such that the waveform pertaining to each of the output nodes of each of said graphical objects is displayed adjacent thereto.

12. The system of claim 11, further comprising:
means for accepting the test pattern in the form of a data file or data list.

13. The system of claim 11, further comprising:
means for grouping said waveform displays into a single composite timing diagram in a single area on said schematic diagram; and means or displaying said composite diagram on said graphical display device adjacent said schematic diagram.

14. The system of claim 11, further comprising:
means for enabling the problem solving user to specify a group of nodes or nets whose simulation results are to be collected in tubular form on said schematic diagram such that a state table is formed as the simulation(s) is(are) run.

15. The system of claim 11, further comprising:
means for displaying, on said graphical display device, simulation results in the form of text.

16. The system of claim 11, further comprising:
means for displaying, on said graphical display device, simulation results in the form of a graphical display of state conditions.

17. Method for simultaneous, interactive presentation of electronic circuit diagrams and simulation data, consisting essentially of:

in a single computer system, interactively performing all of the following steps:

storing objects representative of circuit elements, a portion of which objects are pre-defined, each object associated with a particular schematic symbol, and each object having a plurality of input and/or output nodes to which input and/or output signals are associated;

displaying the objects on a display;

displaying graphical representations of interconnections between said input and output nodes of said objects on the display;

representing the interconnections between said input and output nodes of said objects as "nets";

storing the nets;

manipulating and arranging said pre-defined objects on said display in the form of a schematic diagram;

creating "new nets" representing additional interconnections between said input and output nodes of said objects;

deleting "nets";

modifying "nets" and representing the modified "nets" as additional "new nets";

displaying and storing the "new nets", deleted "nets" and additional "new nets"

providing a plurality of executable simulation models for operating on the interconnected objects;

storing states of the nets in the form of a net-list;

specifying, storing and displaying a signal state on any input or output node of said objects;

specifying a signal state on any of said nets;

applying said signal state simultaneously to all input and output nodes connected to a net;

specifying a portion of said schematic diagram to be simulated;

specifying a duration for said simulation in the form of starting conditions and/or stopping conditions;

executing a simulation of the identified portion of said schematic diagram according to said starting and stopping conditions; and displaying, on said schematic diagram, the end states of said simulation such that the state data corresponding to the output nodes of each of said graphical objects is displayed immediately adjacent thereto during simulation.

* * * * *